United States Patent
Coull

(10) Patent No.: US 8,678,350 B2
(45) Date of Patent: Mar. 25, 2014

(54) VALVE AND METHOD FOR CONTROLLING FLOW IN TUBULAR MEMBERS

(75) Inventor: Craig Coull, Kingwood, TX (US)

(73) Assignee: Baker Hughes Incorporated, Houston, TX (US)

( * ) Notice: Subject to any disclaimer, the term of this patent is extended or adjusted under 35 U.S.C. 154(b) by 857 days.

(21) Appl. No.: 11/686,596

(22) Filed: Mar. 15, 2007

(65) Prior Publication Data

US 2008/0224085 A1 Sep. 18, 2008

(51) Int. Cl.
*F16K 31/00* (2006.01)

(52) U.S. Cl.
USPC ...... 251/342; 251/344; 251/347; 137/601.03; 137/601.04; 166/119; 166/183; 166/186; 166/191; 166/332.1

(58) Field of Classification Search
USPC ............. 251/343, 344, 342, 347; 137/601.03, 137/601.04; 166/118, 119, 183–186, 191, 166/192, 332.1, 344
See application file for complete search history.

(56) References Cited

U.S. PATENT DOCUMENTS

| | | | | |
|---|---|---|---|---|
| 2,675,876 A * | 4/1954 | Conrad et al. | ................ | 166/140 |
| 2,988,148 A * | 6/1961 | Conrad et al. | ................ | 277/337 |
| 3,400,910 A * | 9/1968 | Blinn | ........................... | 251/342 |
| 3,948,322 A | 4/1976 | Baker | | |
| 5,263,683 A | 11/1993 | Wong | | |
| 5,499,687 A | 3/1996 | Lee | | |
| 6,009,951 A * | 1/2000 | Coronado et al. | ............ | 166/387 |
| 6,123,148 A * | 9/2000 | Oneal | ........................... | 166/118 |
| 6,854,522 B2 * | 2/2005 | Brezinski et al. | ............. | 166/387 |
| 6,860,330 B2 | 3/2005 | Jackson | | |
| 6,896,049 B2 | 5/2005 | Moyes | | |
| 7,124,831 B2 * | 10/2006 | Turley et al. | .................. | 166/387 |
| 7,134,506 B2 * | 11/2006 | Moyes | .......................... | 166/387 |
| 7,216,706 B2 * | 5/2007 | Echols et al. | ................. | 166/285 |
| 7,316,271 B2 * | 1/2008 | Moyes | .......................... | 166/179 |
| 7,546,871 B2 * | 6/2009 | Moyes | .......................... | 166/134 |
| 7,588,077 B2 * | 9/2009 | Harper | ......................... | 166/196 |
| 7,610,958 B2 * | 11/2009 | Moyes | .......................... | 166/135 |
| 7,635,021 B2 * | 12/2009 | Palmer | .......................... | 166/55 |
| 7,766,089 B2 * | 8/2010 | Murray | ......................... | 166/387 |
| 7,779,924 B2 * | 8/2010 | Clamens | ....................... | 166/382 |
| 7,861,775 B2 * | 1/2011 | Palmer et al. | ................. | 166/207 |
| 2002/0121380 A1 * | 9/2002 | Doane et al. | .................. | 166/382 |
| 2004/0216868 A1 * | 11/2004 | Owen, Sr. | ..................... | 166/134 |
| 2008/0251261 A1 * | 10/2008 | Arce et al. | .................... | 166/387 |

FOREIGN PATENT DOCUMENTS

GB  2 271 167  4/1994

OTHER PUBLICATIONS

Jansen, J.D. "Smart Wells" Delft University of Technology, Department of Applied Earth Sciences, Section Petroleum Engineering. Smart Wells: Feb. 2001, 11 pages.

(Continued)

*Primary Examiner* — John K Fristoe, Jr.
*Assistant Examiner* — Marina Tietjen
(74) *Attorney, Agent, or Firm* — Cantor Colburn LLP

(57) ABSTRACT

Further disclosed herein is a method for controlling fluid flow. The method includes, selectively deforming at least one selectively deformable member disposed between two tubular members that are radially aligned with one another, at least one of the at least one deformable member being positioned between a fluid inlet and a fluid outlet. The method further includes regulating flow of fluid by deforming the at least one deformable member positioned between the fluid inlet and the fluid outlet sufficiently to achieve a desired flow rate.

16 Claims, 6 Drawing Sheets

(56) References Cited

OTHER PUBLICATIONS

Tyrie, J. "Setting the Value of Permanent Reservoir Monitoring and Control—Intelligent Well Completions—Downhole Flow-Control Valves," World Oil Online, World Oil, Mar. 2002, 5 pages. Retrieved online on Jun. 24, 2008 from: http://findarticles.com/p/articles/mi_m3159/is_3_223/ai_84308704.

Ruijian, L., et al. "Advanced Completions for Injection Applications," Society of Petroleum Engineers, SPE 74392. Villahermosa, MX, Feb. 10-12, 2002, 7 pages.

Vinzant, et al. "The DepthStar—A Solution to an Industry Dilemma," Dexter Magnetic Technologies, Dexter.com, Apr. 2005, 6 pages. Retrieved online on Jun. 24, 2008 from: http://www.dextermag.com/uploadedFiles/TP_DEPTHSTAR.pdf.

International Search Report with Written Opinion, PCT/US2008/050210, Date Mailed Jun. 17, 2008.

* cited by examiner

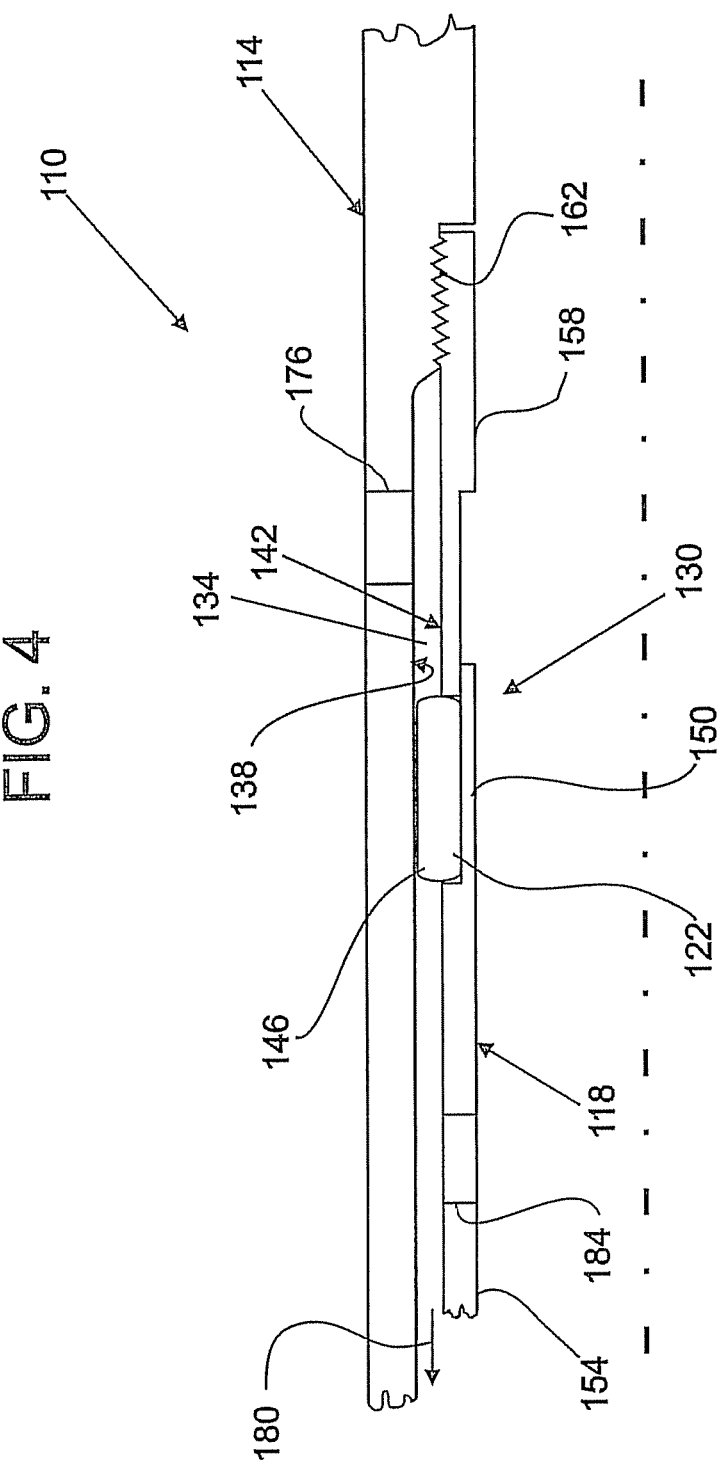

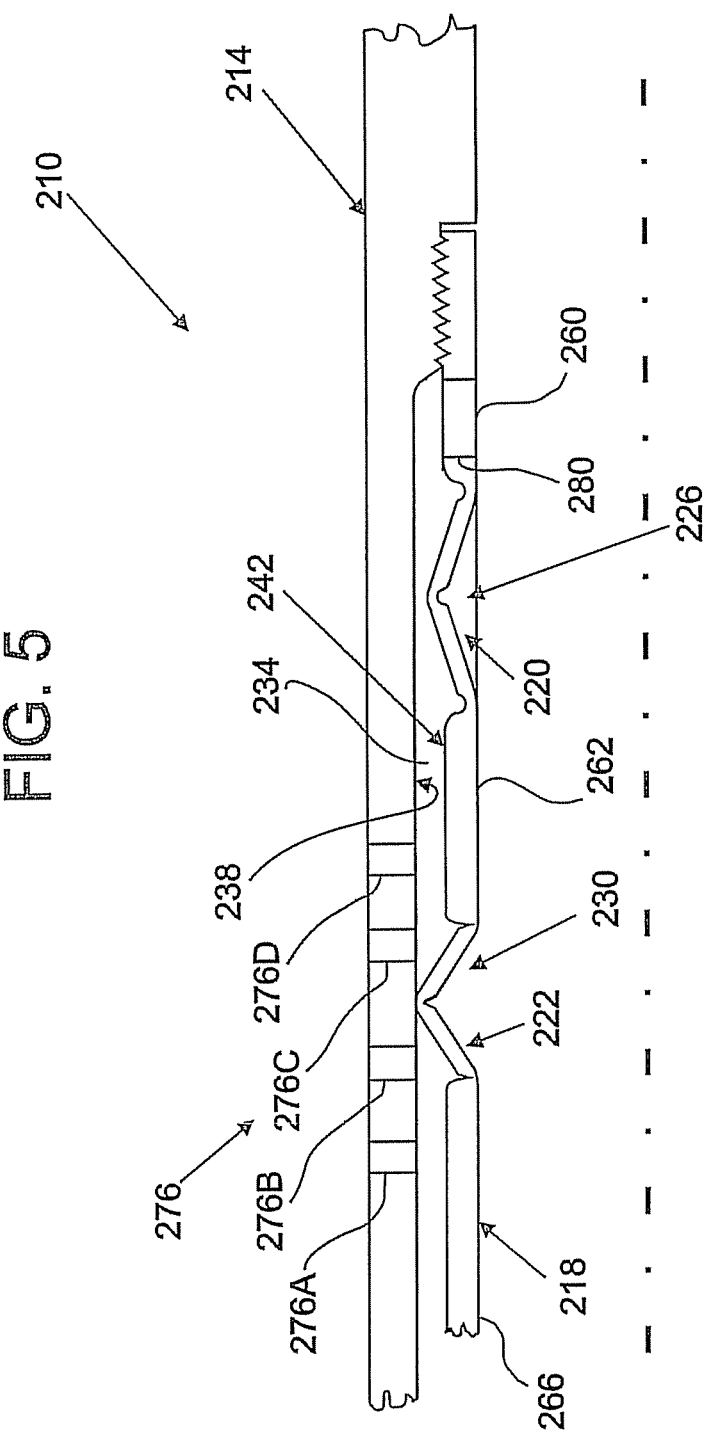

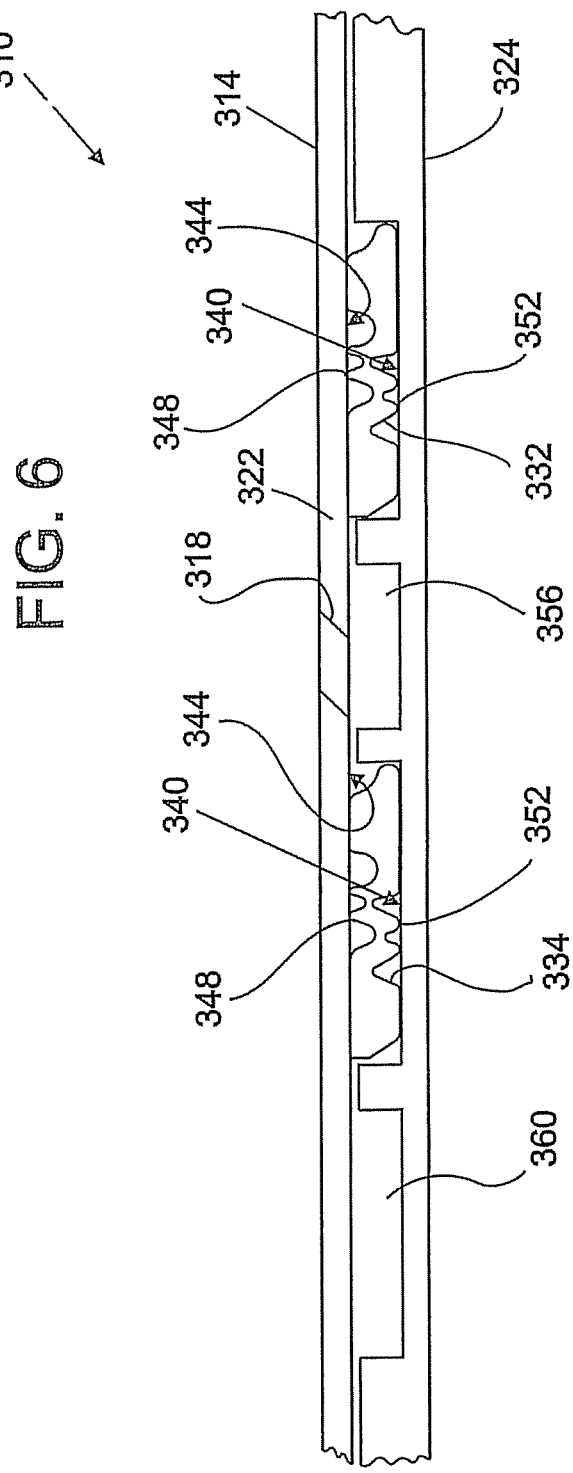

VALVE AND METHOD FOR CONTROLLING FLOW IN TUBULAR MEMBERS

BACKGROUND OF THE INVENTION

Control of fluid flow through various parts of a wellbore is important for optimizing production. Valves to control fluid flow have been developed and are widely used. In some situations it is sufficient to use a valve with only two settings, fully open and fully closed. In other situations it is desirable to be able to choke the flow without shutting it off completely. As wells become more sophisticated there is a desire for increasing accuracy in flow control.

The increasing sophistication of wells also includes an increase in operating costs and consequently an increase in cost for time in which a well is not producing. Failure of flow control valves is, therefore, a costly and undesirable condition. Accordingly, the art is in need of highly durable flow control valves that have highly accurate flow control.

BRIEF DESCRIPTION OF THE INVENTION

Disclosed herein is a valve. The valve includes, a first tubular member having at least one port extending through a wall thereof and a second tubular member at least partially radially aligned with the first tubular member. The first tubular member and the second tubular member are sealably connected at an interface therebetween, one of the first tubular member and the second tubular member supporting at least one sealable member capable of sealingly engaging the other of the first tubular member and the second tubular member, and having a portion movable relative to the interface, the movable portion being located on a first side of the at least one sealable member that is opposite a second side of the at least one sealable member on which the interface is located.

Further disclosed herein is a valve. The valve includes a first tubular member having at least one port extending through a wall thereof, a second tubular member radially aligned with and moveable relative to the first tubular member, one of the first tubular member and the second tubular member supporting at least two metal members capable of sealingly engaging the other of the first tubular member and the second tubular member.

Further disclosed herein is a method for controlling fluid flow. The method includes, selectively deforming at least one selectively deformable member disposed between two tubular members that are radially aligned with one another, at least one of the at least one deformable member being positioned between a fluid inlet and a fluid outlet. The method further includes regulating flow of fluid by deforming the at least one deformable member positioned between the fluid inlet and the fluid outlet sufficiently to achieve a desired flow rate.

BRIEF DESCRIPTION OF THE DRAWINGS

The following descriptions should not be considered limiting in any way. With reference to the accompanying drawings, like elements are numbered alike:

FIG. 4 depicts the tubular valve with a single sealable member of FIG. 3 with the valve in an actuated position;

FIG. 5 depicts a tubular valve with dual sealable members with one sealable member in an unactuated position and the other sealable member in an actuated position; and FIG. 6 depicts a tubular valve with dual sealable members with both sealable members sealingly engaged.

DETAILED DESCRIPTION OF THE INVENTION

A detailed description of several embodiments of the disclosed apparatus and method are presented herein by way of exemplification and not limitation with reference to the Figures.

Figure 1:
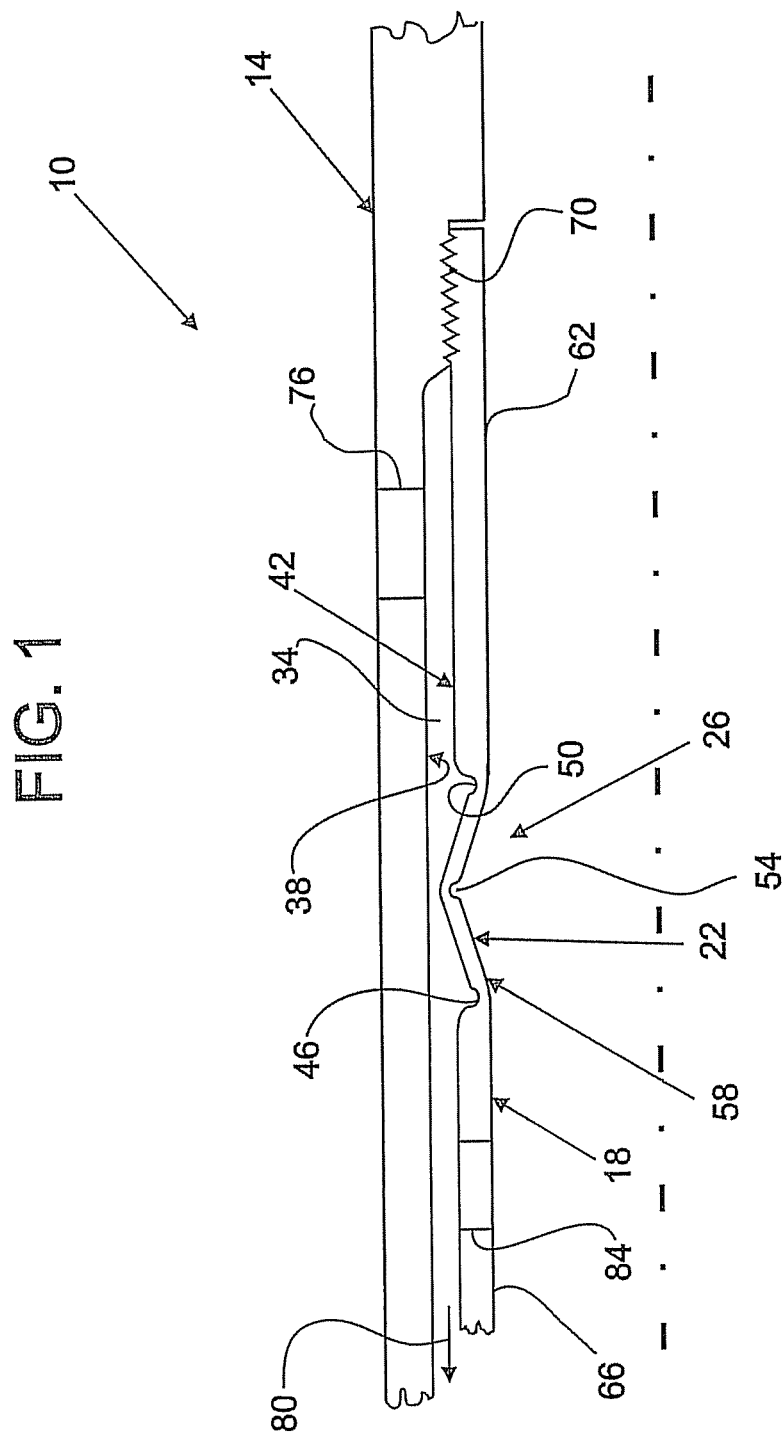
FIG. 1 depicts a tubular valve with a single sealable member in an unactuated position.
Figure 2:
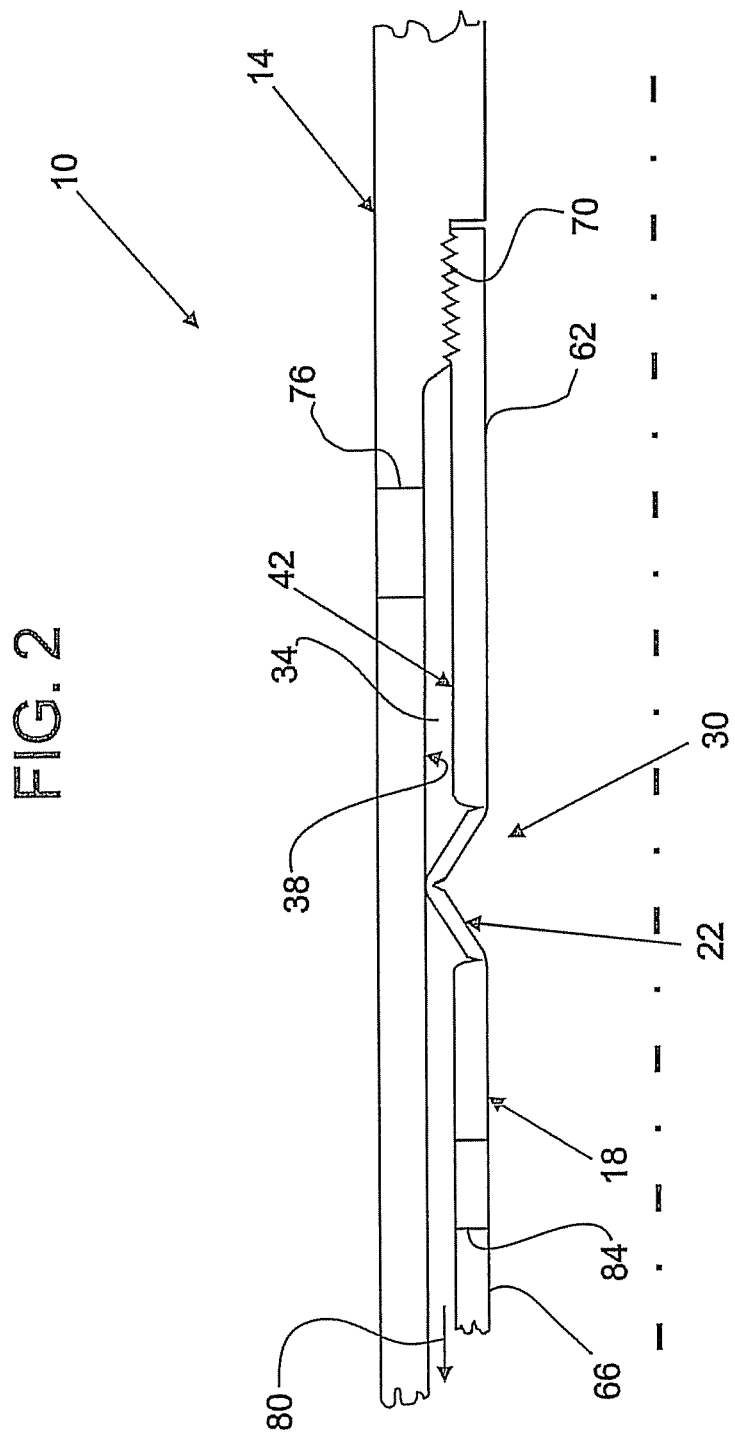
FIG. 2 depicts the tubular valve with a single sealable member of FIG. 1 with the valve in an actuated position.

Referring to FIGS. 1 and 2, an embodiment of the tubular valve 10 is illustrated. The tubular valve 10 includes a first tubular member 14, a second tubular member 18 and a sealable member 22. The sealable member 22 is supported by the second tubular member 18 and is sealably engagable with the first tubular member 14 in response to a selectable repositioning of the sealable member 22. Referring specifically to FIG. 1, the sealable member 22 is not sealably engaged with the first tubular member 14 when the sealable member 22 is in an unactuated position 26 as shown. Referring specifically to FIG. 2, the sealable member 22 is sealably engaged with the first tubular member 14 when the sealable member 22 is in an actuated position 30 as shown. An annular space 34 exists between an inner surface 38, of the first tubular member 14, and an outer surface 42, of the second tubular member 18, and provides a fluid flow path therethrough. In the actuated position 30 the sealable member 22 sealably engages the inner surface 38 thereby fully occluding the annular space 34 and closing the tubular valve 10 to fluidic flow therethrough. By contrast, in the unactuated position 26, the sealable member 22 does not occlude the annular space 34 at all and thereby defines a fully open condition of the tubular valve 10. The sealable member 22 can also occlude a fractional portion of the annular space 34 between fully closed and fully open. When doing so the amount of occlusion varies in proportion to the amount of extension of the sealable member 22 between the unactuated 26 and the actuated 30 positions. It should be noted that while the foregoing embodiment has the sealable member 22 supported by the second tubular member 18, alternate embodiments could just as well have a sealable member supported by, or integrated into, the first tubular member 14. Such an alternate embodiment could have a sealable member extend radially inwardly to sealably engage with the outer radial surface 42 of the second tubular member 18, for example.

Repositioning of the sealable member 22, in the second tubular member 18, is in one embodiment due to construction thereof. The sealable member 22 is formed from a section of the second tubular member 18 that has three lines of weakness 46, 50, and 54, specifically located both axially of the tubular member 18 and with respect to an inside surface 58 and the outer surface 42 of the second tubular member 18. In one embodiment, a first line of weakness 46 and a second line of weakness 50 are defined in this embodiment by diametrical grooves formed in the outer surface 42 of the second tubular member 18. A third line of weakness 54 is defined in this embodiment by a diametrical groove formed in the inside surface 58 of the second tubular member 18. The three lines of weakness 46, 50, and 54 each encourage local deformation of the tubular member 18 in a radial direction that tends to cause the groove to close. It will be appreciated that in embodiments where the line of weakness is defined by other than a groove, the radial direction of movement will be the same but since there is no groove, there is no "close of the groove." Rather, in such an embodiment, the material that defines a line of weakness will flow or otherwise allow radial movement in the direction indicated. The three lines of weakness together encourage deformation of the tubular member 18 in a manner that creates a feature such as the sealable member 22 in the actuated position 30. The feature is created, then, upon the application of an axially directed mechanical compression of the tubular member 18 such that the actuated position 30 of the sealable member 22 is formed as the tubular member 18 is compressed to a shorter overall length. Other mechanisms can alternatively be employed to actuate the tubular member 18 between the unactuated 26 and the actuated 30 positions of the sealable member 22. For example, the sealable member 22 may be repositioned to the actuated position 30 by pressurizing the inner surface 38, for example.

The tubular valve 10 has the further capability however of allowing the sealable member 22 to be repeatedly repositioned. More specifically the sealable member 22 may be repeatedly repositioned to the unactuated position 26 (FIG. 1), or any position between the fully unactuated position 26 and the fully actuated position 30 (FIG. 2). This variability of extension of the sealable member 22 allows the fluid flowing through the annular space 34 to be choked to any desirable level. Such repositioning is effected, in one embodiment, by the application of an axially tensive load on the second tubular member 18, thereby elongating the second tubular member 18 in the process. Control, therefore, of the amount of extension of the sealable member 22 into the annular space 34, in this embodiment, is determined by the amount of axial compression or elongation of the second tubular member 18 about the sealable member 22.

Compression and elongation of the second tubular member 18 can be controlled by relative movement of a first portion 62, of the second tubular member 18, with respect to a second portion 66, of the second tubular member 18. Similarly, movement of the first tubular member 14 relative to the second portion 66 can control the same compression and elongation, since the first portion 62 is attached to the first tubular member 14 by, for example, threads 70. As such, since there is no relative motion between the first portion 62 and the first tubular member 14, motion of the second portion 66 can be made relative to either the first portion 62 or the first tubular member 14 thereby controlling the actuation of the tubular valve 10.

The annular space 34, through which the sealable member 22 extends, defines a fluidic flow path that is to be throttled or choked by an amount of actuation of the sealable member 22. Thus, choke control of a desired flow path can be achieved by fluidically connecting the desired flow path to the annular space 34. For example, a port 76 that extends radially through the first tubular member 14 positioned downhole of the sealable member 22 provides flow from radially outside the first tubular member 14 into the annular space 34. In such an embodiment the flow from outside the first tubular member 14 to an uphole directed annulus 80 is controllable via the sealable member 22. In an alternate embodiment, such as one where the uphole directed annulus 80 is dead headed, for example, a port 84 through the second portion 66 of the second tubular member 18 can fluidically connect the annular space 34, uphole of the sealable member 22 to an inside of the second tubular member 18. In so doing the tubular valve 10 can control flow in either direction between the outside of the first tubular member 14 to the inside of the second tubular member 18.

In one embodiment disclosed in FIGS. 1 and 2 the sealable member 22 is an integral part of one of the two tubular members 14, 18 and the tubular members 14, 18 may both be made of metal. In such an embodiment the seal created between the sealable member 22 and the first tubular member 14 is a metal-to-metal seal. Such a metal-to-metal seal can have excellent durability in a high pressure, high temperature and caustic environment commonly experienced in wellbores.

Figure 3:
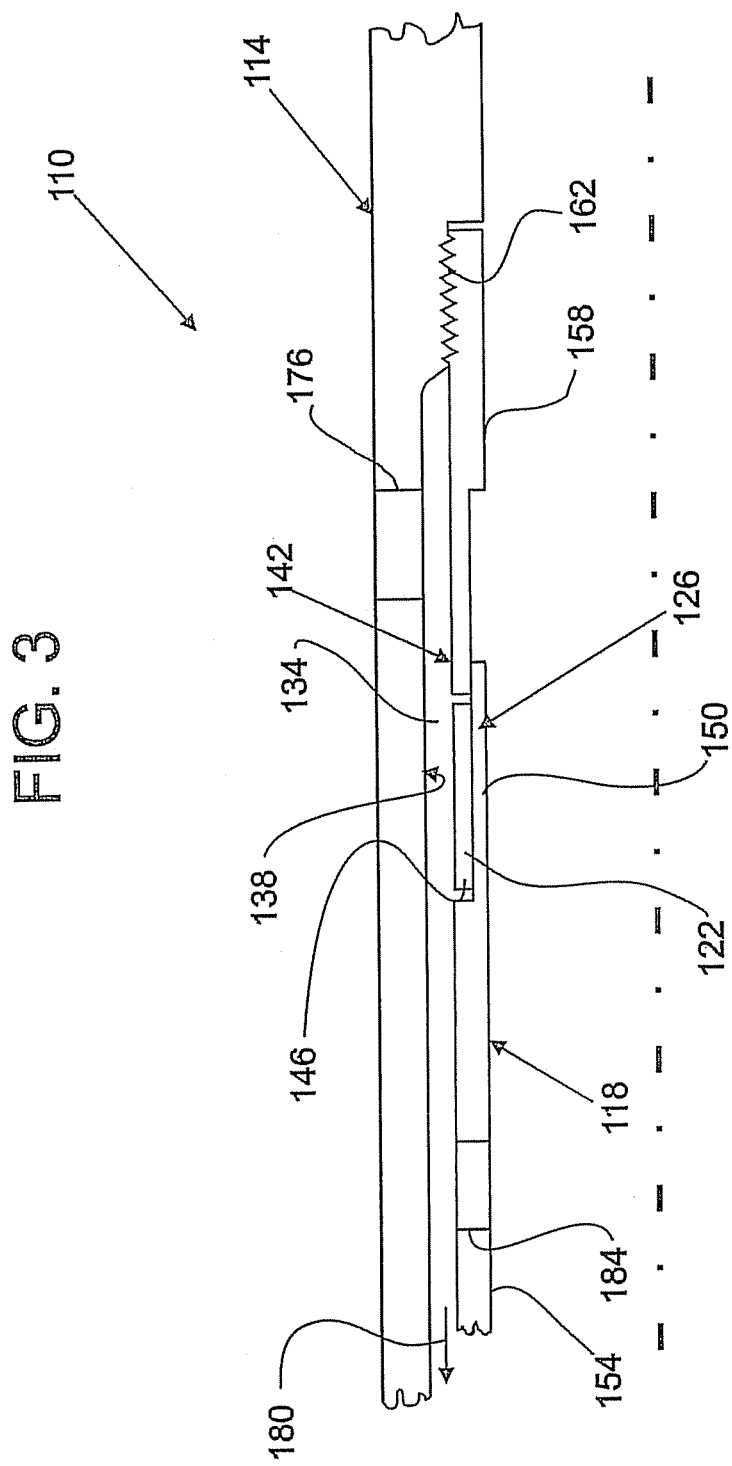
FIG. 3 depicts an alternate tubular valve with a single sealable member in an unactuated position.

Referring to FIGS. 3 and 4 an alternate embodiment of the tubular valve 110 with an elastomeric seal is illustrated. The tubular valve 110 includes a first tubular member 114, a second tubular member 118 and a sealable member 122. The sealable member 122 is supported by the second tubular member 118 and is sealably engagable with the first tubular member 114 in response to a selectable repositioning of the sealable member 122. Referring specifically to FIG. 3, the sealable member 122 is not sealably engaged with the first tubular member 114 when the sealable member 122 is in an unactuated position 126 as shown. Referring specifically to FIG. 4, the sealable member 122 is sealably engaged with the first tubular member 114 when the sealable member 122 is in an actuated position 130 as shown. An annular space 134 exists between an inner surface 138, of the first tubular member 114, and an outer surface 142, of the second tubular member 118, and provides a fluid flow path therethrough. In the actuated position 130 the sealable member 122 sealably engages the surface 138 thereby fully occluding the annular space 134 and closing the tubular valve 110 to fluidic flow therethrough. By contrast, in the unactuated position 126 the sealable member 122 does not occlude the annular space 134 at all and thereby defines a fully open condition of the tubular valve 110. The sealable member 122 can also occlude a fractional portion of the annular space 134 between fully closed and fully open. When doing so the amount of occlusion varies in proportion to the amount of extension of the sealable member 122 between the unactuated 126 and the actuated 130 positions. It should be noted that while the foregoing embodiment has the sealable member 122 supported by the second tubular member 118, alternate embodiments could have a sealable member supported by, or integrated into, the first tubular member 114. Such an alternate embodiment could have a sealable member extend radially inwardly to sealably engage with the outer radial surface 142 of the second tubular member 118, for example. Multiple sealable members could also be incorporated into embodiments as will be discussed in detail below.

Repositioning of the sealable member 122, supported by the second tubular member 118, is due to construction thereof. The sealable member 122 is formed from an elastomeric band 146 that circumferentially surrounds a reduced dimension portion 150 of an uphole portion 154 of the second tubular member 118. The elastomeric band 146 is positioned axially between the uphole portion 154 and a downhole portion 158 of the second tubular member 118. Movement of the uphole portion 154 towards the downhole portion 158 compresses the elastomeric band 146 axially which results in the elastomeric band 146 increasing in size diametrically until the band 146 males contact with the inner surface 138. The actuated position 130 is created, then, upon the application of an axially directed mechanical compression of the tubular member 118 such that the actuated position 130 of the sealable member 122 is formed as the tubular member 118 is compressed to a shorter overall length.

The tubular valve 110 has the further capability however of allowing the sealable member 122 to be repeatedly repositioned. More specifically the sealable member 122 may be repeatedly repositioned to the unactuated position 126 (FIG. 1), or any position between the fully unactuated position 126 and the fully actuated position 130 (FIG. 2). This variability of extension of the sealable member 122 allows the fluid flowing through the annular space 134 to be choked to any desirable level. Such repositioning is effected, in one embodiment, by the application of an axially tensive load on the second tubular member 118, thereby elongating the second tubular member 118 in the process. Control, therefore, of the amount of extension of the sealable member 122 into the annular space 134, in this embodiment, is determined by the amount of axial compression or elongation of the second tubular member 118 about the sealable member 122.

Compression and elongation of the second tubular member 118 can be controlled by relative movement of the uphole portion 154 with respect to the downhole portion 158 of the second tubular member 118. Similarly, relative movement of the uphole portion 154 relative to the first tubular member 114 can control this compression and elongation, since the downhole portion 158 is attached to the first tubular member 114 by threads 162. As such, since there is no relative motion between the downhole portion 158 and the first tubular member 114, motion of the uphole portion 154 can be made relative to either the downhole portion 158 or the first tubular member 114. Thus controlling these relative motions can control the actuation of the tubular valve 110.

The annular space 134, through which the sealable member 122 extends, defines a fluidic flow path that is to be throttled or choked by an amount of actuation of the sealable member 122. Thus, choke control of a desired flow path can be achieved by fluidically connecting the desired flow path to the annular space 134. For example, a port 176 that extends radially through the first tubular member 114 positioned downhole of the sealable member 122 provides flow from radially outside the first tubular member 114 into the annular space 134. In such an embodiment the flow from outside the first tubular member 114 to an uphole directed annulus 180 is controllable via the sealable member 122. In an alternate embodiment, such as one where the uphole directed annulus 180 is dead headed, for example, a port 184 through the uphole portion 154 of the second tubular member 118 can fluidically connect the annular space 134, uphole of the sealable member 122 to an inside of the second tubular member 118. In so doing the tubular valve 110 can control flow in either direction between the outside of the first tubular member 114 to the inside of the second tubular member 118. It should be noted that although components are labeled herein with terms such as uphole (i.e. uphole portion) and downhole (i.e. downhole portion), these terms are only used to define relative positioning of the components and as such could have these terms reversed or replaced with other terms to define relative positioning of the components.

Referring to FIG. 5 an alternative embodiment of the tubular valve 210 is illustrated. The tubular valve 210 includes a first tubular member 214, a second tubular member 218, a first sealable member 220, and a second sealable member 222. In this embodiment the sealable members 220 and 222 are supported by the second tubular member 218 and are sealably engagable with the first tubular member 214 in response to a selectable position of the sealable members 220, 222. The sealable member 220 is not sealably engaged with the first tubular member 214 as the sealable member 220 is in an unactuated position 226 as shown. The sealable member 222 is sealably engaged with the first tubular member 214 as the sealable member 222 is in an actuated position 230 as shown. An annular space 234 exists between an inner surface 238, of the first tubular member 214, and an outer surface 242, of the second tubular member 218, and provides a fluid flow path therethrough. In the actuated position 230 the sealable member 222 sealably engages the surface 238 thereby fully occluding the annular space 234. By contrast, in the unactuated position 226 the sealable member 220 does not occlude the annular space 234 at all. The sealable members 220, 222 can also occlude a fractional portion of the annular space 234 between fully closed and fully open. When doing so the amount of occlusion varies in proportion to the amount of extension of the sealable members 220, 222 between the unactuated 226 and the actuated 230 positions. It should be noted that while the foregoing embodiment has the sealable members 220, 222 supported by the second tubular member 218, alternate embodiments could have sealable members supported by, or integrated into, the first tubular member 214. Such an alternate embodiment could have sealable members extend radially inwardly to sealably engage with the outer radial surface 242 of the second tubular member 218, for example. Alternatively, embodiments could also have one or more sealable members supported by or integrated into the second tubular member 218 and simultaneously have one or more sealable members supported by or integrated into the first tubular members 214.

Repositioning of the sealable members 220, 222, in the second tubular member 218, is due to construction thereof. The sealable members 220, 222 are formed from sections of the second tubular member 218 in the same way that the sealable member 22 of FIGS. 1 and 2 is formed of a section of the second tubular member 18 and therefore will not be described in detail again here. One difference, however, in this embodiment is that tubular valve 210 has two sealable members 220 and 222, and thus a third portion 260 of the second tubular member 218 is movable relative to a first portion 262 and a second portion 266 of the tubular member 218. In fact, by having each portion 260, 262, 266 be movable independently relative to each of the other portions 260, 262, 266, the two sealable members 220 and 222 are independently extendable to any desired amount of extension. It should be noted that alternate embodiments could have more than two sealable members 220, 222. And, regardless of how many sealable members 220, 222 are used, each could be independently repositionable.

In the embodiment of the tubular valve 210, for example, the first two sealable members 220, 222 could be repositioned independently of one another. To do so simply requires independent control over the movement of the three portions 260, 262 and 266 relative to one another. Moving the third portion 266 relative to the portions 262, 260, held stationary, for example, will allow repositioning of the second sealable member 222 without repositioning the first sealable member 220. Similarly, by moving the third portion 266 and the second portion 262 in unison relative to the first portion 260, held stationary, allows for repositioning of the first sealable member 220 without repositioning of the second sealable member 222. Thus, a series of valves can be independently controllable to choke fluid flow therethrough. Additionally, the valves can be set to control fluid flow in various ways depending upon how the annular space 234 about the sealable members 220, 222 is ported. The embodiment of the tubular valve 210, described below, is one example of how improved resolution of choke control can be attained through porting.

In an embodiment of the tubular valve 210 a first ports 276 in the first tubular member 214 includes multiple ports 276a, 276b, 276c and so forth. Having a plurality of ports 276 allows for an additional level of flow control between the ports 276 and a second port 280, for example, located in the second tubular member 218. This additional level of flow control results from the axial movement of the second sealable member 222, relative to the ports 276, provided by repositioning of the first sealable member 220. For example, the ports 276c and 276d could be located downhole of the sealable member 222 while the ports 276a and 276b could be located uphole of the sealable member 222, as shown. Then, in response to repositioning of the first sealable member 220, the second sealable member 222 can move in a downhole direction relative to the ports 276. Such movement could be settable, based upon the geometry of the first sealable member 220 and the spacing of the ports 276, such that all of the ports 276 are located uphole of the second sealable member 222, for example. Resolution could be increased further still by selective distribution of the ports 276 about the first tubular member 214. For example, the ports 276 can be distributed axially, perimetrically or a combination of both axially and perimetrically relative to the tubular member 214. It should be noted that while repositioning of the first sealable member 220 causes axial movement of the second sealable member 222 it also results in a change in the extension of the first sealable member 220 into the annular space 234, which in itself will effect the choking level of the fluid therethrough. An alternate embodiment that provides for axial movement of a sealable member relative to ports without choking in an alternate location will be reviewed below.

Referring to FIG. 6 a partial cross sectional view of an alternate embodiment of the tubular valve 310 that incorporates a plurality of metal sealable members is illustrated. A first tubular member 314 has a port 318 extending through a wall 322 thereof. The port 318 permits fluid communication between an outside of the first tubular member 314 and annular flow channels to be described in more detail below. A second tubular member 324 is coaxially located radially inwardly of the first tubular member 314 and is axially slidably engaged with the first tubular member 314. The tubular members 314, 324 are made of a rigid material such as metal, for example. The second tubular member 324 supports a first sealable member 332 and a second sealable member 334. Both sealable members 332, 334 fully occlude an annular space 336 that exists between an outer surface 340, of the second tubular member 324, and an inner surface 344, of the first tubular member 314. The sealable members 332, 334 are made of metal and are elastically deformable and as such are deformed radially by the compression between the surfaces 340 and 344. The elastic deformation of the sealable members 332, 334 maintains a sealing force between outward extensions 348, of sealable members 332, 334, and the surface 344 and inward extensions 352, of sealable members 332, 334 and the surface 340.

The forgoing structure allows the tubular valve 310 to selectively port the outside of the first tubular member 314 with either a first annular flow channel 356 or a second annular flow channel 360 that exists between the first tubular member 314 and the second tubular member 324. The first annular flow channel 356 is positioned between the sealable members 332, 334 while the second annular flow channel 360 is positioned on an uphole side (shown in FIG. 6) or a downhole side of the sealable members 332, 334. By selective axially movement of the second tubular member 324 relative to the first tubular member 314 the port 318 can be fluidically coupled to only the first annular flow channel 356, only the second annular flow channel 360 or a portion of both annular flow channel 356, 360. As such, the tubular valve 310 can be used to choke the flow between either channel 356, 360 and the exterior of the first tubular member 314. It should be noted, however, that by positioning the port 318 in the second tubular member 324 the flow control can be between the either channel 356, 360 and the interior of the second tubular member 324. Additionally, by placing ports in both tubular members 314, 324 flow control can be established between the outside of the first tubular member 314 and the inside of the second tubular member 324. The port 318, in alternate embodiments, may include a plurality of ports arranged axially only, perimetrically only, or both axially and perimetrically about a circumference of the tubular member 314 to thereby increase resolution of the flow control provided per unit of movement of the tubular members 314, 324 relative to one another.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A valve comprising:
a first tubular member having a plurality of axially spaced first ports extending through a wall thereof; and
a second tubular member having at least one second port extending through a wall thereof, being at least partially radially aligned with the first tubular member, the first tubular member and the second tubular member being sealably connected at an interface therebetween, the second tubular member supporting at least one sealable member formed of a first deformable portion capable of slidably sealingly engaging the first tubular member, and a second deformable portion of the second tubular defining longitudinal movability of the at least one sealable member relative to the plurality of axially spaced first ports to selectively allow, choke or prevent flow between fewer than all of the plurality of axially spaced first ports and the at least one second port, the first deformable portion and the second deformable portion being configured to upon axial compression thereof cause the first deformable portion to deform and set the at least one sealable member into sealing engagement prior to deforming the second deformable portion.

2. The valve as claimed in claim 1 wherein the at least one sealable member is a metal seal.

3. The valve as claimed in claim 1 wherein displaceability of the at least one sealable member is sufficient to position a seal formed by the at least one sealable member on a same side of the plurality of axially spaced ports as the interface is positioned.

4. The valve as claimed in claim 1 wherein the plurality of axially spaced ports are distributed perimetrically about the first tubular member.

5. The valve as claimed in claim 1 wherein the second port is axially displaced from the plurality of axially spaced ports.

6. The valve as claimed in claim 1 wherein the at least one sealable member is variably repositionable via deformation of the first deformable portion between fully occluding an annular space between the first tubular member and the second tubular member and fully retracted from the annular space.

7. The valve as claimed in claim 1 wherein at least one of the first deformable portion and the second deformable portions is metal.

8. The valve as claimed in claim 7 wherein the at least one of the first deformable portion and the second deformable portion has a tubular shape defining a wall, the wall having at least three circumferential lines of weakness, the first and the second of the lines of weakness being on one of an inner and an outer surface of the wall and the third line of weakness being on the opposite of the inner and the outer surface of the wall from that on which the first and the second lines of weakness are located, the three lines of weakness being separated from each other along an axial direction of the at least one selectively deformable portions, the third line of weakness being positioned axially between the first and the second lines of weakness defining a direction of deformation responsive to an axially compressive force on the at least one of the first deformable portion and the second deformable portion.

9. The valve as claimed in claim 8 wherein the first and the second lines of weakness are in the outer surface of the wall and the third line of weakness is on an inner surface of the wall such that the at least one of the first deformable portion and the second deformable portion deforms in a direction substantially radially outwardly in response to application of an axially compressive force.

10. The valve as claimed in claim 8 wherein the at least one of the first deformable portion and the second deformable portion is integrally formed in the second tubular member.

11. The valve as claimed in claim 8 wherein the lines of weakness comprise open grooves.

12. The valve as claimed in claim 1 wherein the second deformable portion is positioned axially between the plurality of first axially spaced ports of the first tubular member and the at least one second port.

13. A valve comprising:
    a first tubular having a plurality of longitudinally spaced ports therethrough; and
    a second tubular sealingly fixedly attached to the first tubular at an interface, the second tubular having a sealable member defined by a first deformable portion sealingly engagable with the first tubular and at least one second deformable portion configured to longitudinally move the sealable member while the sealable member is sealingly engaged with the first tubular from a first position being fully beyond the plurality of longitudinally spaced ports in a first direction to a second position that is fully beyond the plurality of longitudinally space ports in a second direction.

14. The valve of claim 13 wherein the second deformable portion deforms radially to move the sealable portion longitudinally relative to the interface.

15. The valve of claim 13 wherein the second deformable portion is a metal.

16. The valve of claim 13 wherein the first direction is longitudinally opposite to the second direction.

* * * * *